United States Patent [19]
Long et al.

[11] Patent Number: 5,669,473
[45] Date of Patent: Sep. 23, 1997

[54] HYDRAULIC CONTROL WITH LINE PRESSURE MODULATION

[75] Inventors: Charles Francis Long, Pittsboro; Martin Robert Dadel, Indianapolis, both of Ind.

[73] Assignee: General Motors Corporation, Detroit, Mich.

[21] Appl. No.: 642,982

[22] Filed: May 6, 1996

[51] Int. Cl.[6] .................................................... F16H 45/02
[52] U.S. Cl. ................................................ 192/3.3; 74/732.1
[58] Field of Search ............................. 192/3.3; 477/62, 477/65; 74/733.1, 732.1

[56] References Cited

U.S. PATENT DOCUMENTS

| | | |
|---|---|---|
| 4,768,632 | 9/1988 | Moan .................................. 192/3.3 |
| 4,880,090 | 11/1989 | Ando .................................. 192/3.3 |
| 4,880,091 | 11/1989 | Hasegawa et al. ................... 192/3.3 |
| 5,251,734 | 10/1993 | Benford et al. ..................... 192/3.3 |

*Primary Examiner*—Rodney H. Bonck
*Attorney, Agent, or Firm*—Donald F. Scherer

[57] ABSTRACT

A hydraulic control for a transmission has a main line regulator, a torque converter clutch relay valve and a torque converter clutch solenoid valve. During torque converter operation, the pressure regulator is subjected to a line pressure bias signal and supplies pressurized hydraulic fluid to a control system at a substantially constant pressure level. During torque converter clutch operation, the pressure regulator is subjected to an additional line pressure bias signal and a variable pressure bias signal from the torque converter clutch solenoid valve to provide a modulated pressure control whereby main pressure is varied proportionally with torque converter clutch apply pressure.

3 Claims, 2 Drawing Sheets

HYDRAULIC CONTROL WITH LINE PRESSURE MODULATION

TECHNICAL FIELD

This invention relates to pressure control systems for use in power transmission.

BACKGROUND OF THE INVENTION

Automatic transmissions used in transportation vehicles, such as buses and large trucks, require a positive displacement pump to supply pressurized hydraulic fluid for engagement of clutches and brakes, torque converter operation and cooling.

These pumps require power from the engine or prime mover to supply the required control pressure. The power absorbed by the pump and therefore supplied by the engine is a function of the pressure and displacement of the pump. The higher the pump output pressure or main pressure of the transmission, the more horsepower required from the engine.

Current transmissions utilize control mechanisms having electronic or electrical input systems. These electrical systems are supplied with signals from the engine to the vehicle and the transmission. The signals are utilized to determine the operation of various solenoid valves within the control to modulate various pressures including the main pressure or line pressure of the transmission. These modulated pressures of the line pressure are utilized to improve the fuel economy of the vehicle.

Considerable flexibility is available utilizing the electronic controls, particularly in view of the multitude of signals available to the transmission control. For example, the signals can indicate the vehicle speed, the engine speed, the throttle setting, the gear ratio presently selected in the transmission and the operation of the torque converter. The currently used controls have a single solenoid member, the sole purpose of which is to modulate the line pressure of the pump. This, of course, adds cost and complexity to the transmission. However, it does provide improved economy and therefore has been found quite useful.

SUMMARY OF THE PRESENT INVENTION

It is an object of the present invention to provide an improved control mechanism wherein hydraulic power requirements are reduced and the complexity of the control is reduced.

In one aspect of this invention, the line pressure regulator and torque converter relay valve are combined with the torque converter solenoid control valve to provide modulation of the line pressure.

The torque converter relay valve which directs fluid pressure to and from the torque converter is disposed in a spring set position during torque converter operation and a pressure set position during torque converter clutch operation. The torque converter solenoid valve supplies fluid pressure to the relay valve to effect the shift or valve change from the spring set to pressure set positions.

The torque converter solenoid valve also supplies the pressure required to pressurize the torque converter clutch. The relay valve is connected through a passage with the regulator valve, such that torque converter clutch operation a line pressure bias is utilized to knock down or reduce the main line pressure when the torque converter clutch is engaged.

The torque converter solenoid valve is also in fluid communication with the regulator valve to provide a pressure bias thereto. The pressure bias supplied by the torque converter solenoid valve causes a proportionate increase in main line pressure with an increase in the torque converter clutch solenoid pressure. Therefore, as the torque converter clutch pressure rises, so does main line pressure. This is consistent with the desired operation since increased torque converter clutch pressure is a signal of increased torque requirements at the vehicle final drive or drive wheels.

The present invention will provide normal torque converter flow and normal line pressure regulation functions. The invention will also provide torque converter clutch pressure modulation as a result of the various signals which are received from the vehicle and the transmission. The invention further is effective to provide line pressure modulation based on the electronic signals received from the vehicle and transmission by way of the torque converter clutch solenoid valve. With these improved controls of the system pressure, the invention provides for improved fuel economy through the reduced maximum for operating line pressure during torque converter clutch operation.

DESCRIPTION OF AN EXEMPLARY EMBODIMENT

Figure 1:
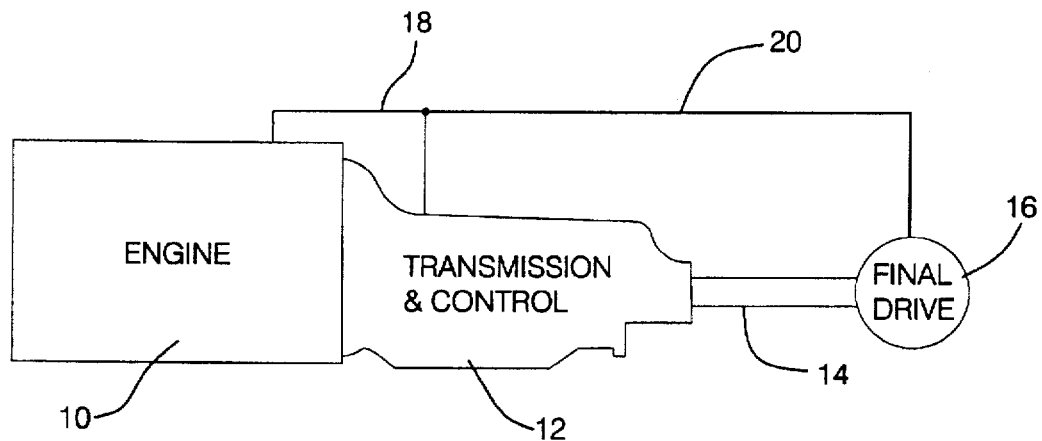
FIG. 1 is a block diagram of an engine, transmission and final drive arrangement used in a vehicle.

The powertrain utilized in heavy duty transportation vehicles include an engine 10, which is drivingly connected in a conventional manner to a torque converter transmission and control 12. The output of the transmission is delivered via a drive shaft 14 to a final drive gearing 16 which, in turn, is connected to the vehicle drive wheels, not shown.

The transmission and control 12 receives electrical signals from the engine and final drive ratio via wires 18 and 20, respectively. These signals can indicate the engine speed and engine throttle setting and the vehicle speed. Internal signals within the transmission are available to determine the particular gear ratio and condition of the torque converter clutch.

Figure 2:
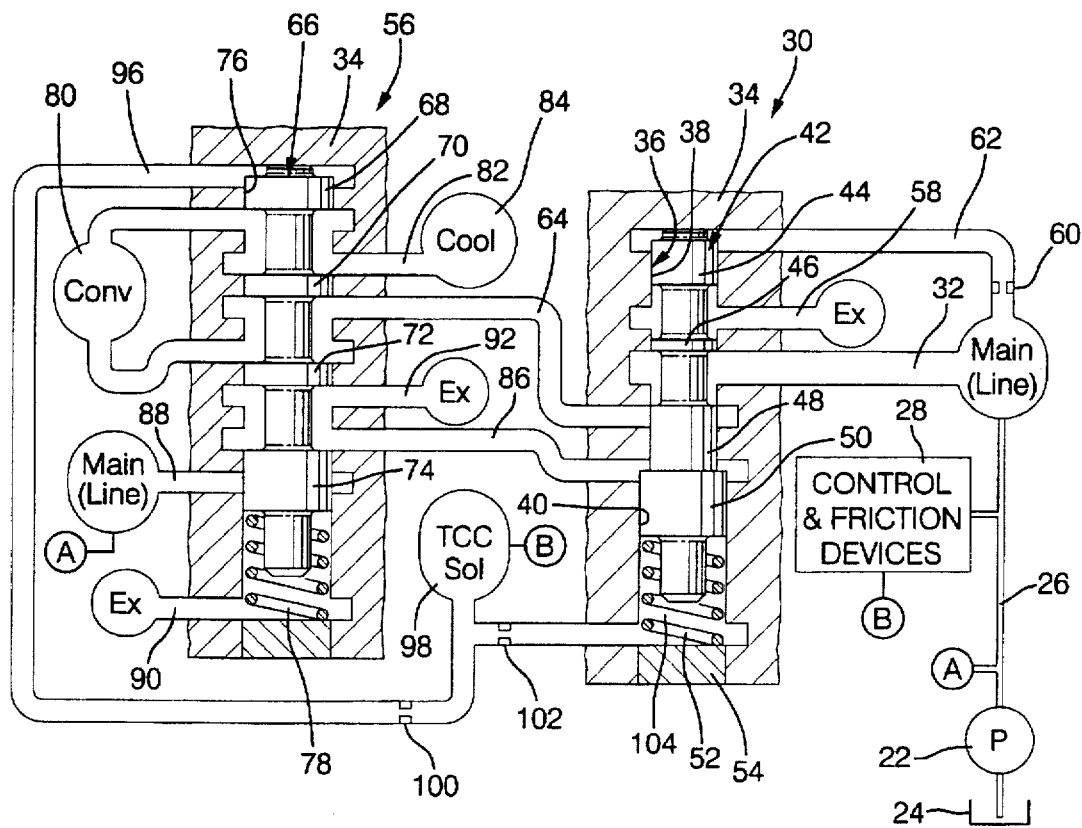
FIG. 2 is a portion of the transmission control depicting the main regulator and torque converter clutch valve in diagrammatic representation.
Figure 3:
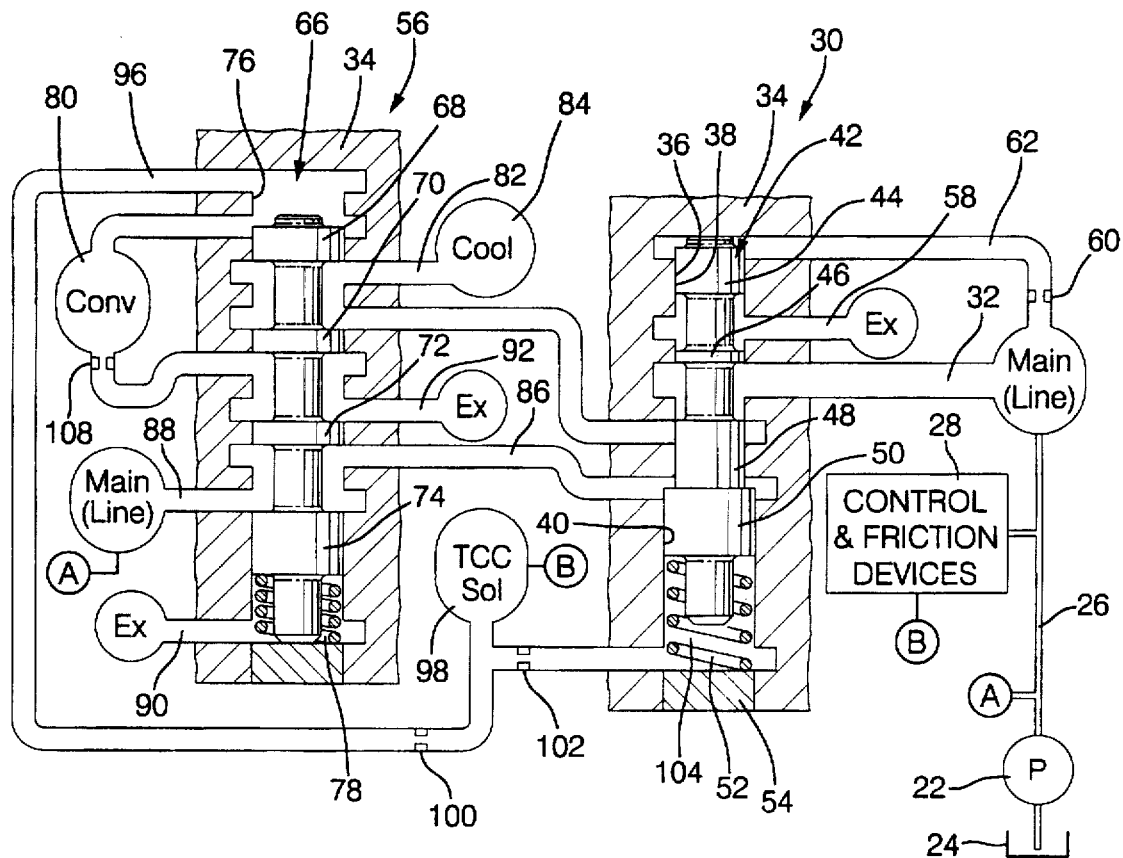
FIG. 3 is a view similar to FIG. 2 with the torque converter clutch relay valve shown in the pressure set position.

The transmission control includes, as seen in FIGS. 2 and 3, a positive displacement pump 22 which is a conventional hydraulic pump drawing fluid from a reservoir or sump 24 for delivery to a main line passage 26. The main line passage directs fluid to a control and transmission friction devices 28 which are conventional well known devices utilized in power transmissions. The control 28 includes a main regulator valve 30 which receives fluid from the main passage 26 via branch passage 32.

The main regulator valve 30 includes a transmission valve body 34 having formed therein a stepped bore 36 having a small diameter portion 38 and a larger diameter portion 40. Slidably disposed within the valve bore 36 is a valve spool 42 having a plurality of lands 44, 46, 48 and 50. The valve lands 44, 46 and 48 are of equal diameter and slidably disposed within the bore portion 38. The valve land 50 is of larger diameter and is slidably disposed in the bore portion 40.

A conventional vehicle compression spring 52 is disposed between a plug 54 and the land 50 to urge the valve spool 42 upward, as seen in FIG. 2. The main pressure in passage 32 is delivered between lands 46 and 48 for distribution to a torque converter clutch relay valve 56 and to an exhaust passage 58. The main pressure is also directed through a restriction 60 to a branch 62 which provides fluid pressure to operate on the end of land 44. Fluid pressure operating on land 44 will urge the valve spool 42 downward against the spring 52. The valve spool 42 will not move downward until the fluid pressure is sufficient to overcome the force in spring 52. This will occur when the control 28 has sufficient pressure to satisfy the friction devices needed to establish the ratio within the transmission. When this fluid pressure level has been attained, the valve spool 42 will move downward permitting fluid pressure to be directed to a torque converter passage 64 which is connected with the torque converter clutch relay valve 56.

The torque converter clutch relay valve has a valve spool 66 slidably disposed in the valve body 34. The valve spool 66 has four equal diameter lands 68, 70, 72 and 74 which are slidably disposed in a bore 76. The valve spool 66 is urged upward, as seen in FIG. 2, by a compression spring 78.

The fluid pressure in passage 64 is directed between lands 70 and 72 to a conventional torque converter 80. The fluid from torque converter 80 is directed through the torque converter clutch relay valve to a cooling passage 82 which is directed to a fluid cooler or radiator 84 which, in turn, directs fluid back to the sump 24. The torque converter clutch relay valve 56 is connected with a knock down or line pressure bias passage 86, a branch passage 88 of main line pressure, and a pair of exhaust passages 90 and 92 and a control passage 96. The passage 96 is in fluid communication with a torque converter clutch solenoid valve 98 through a restriction 100.

When the valve 56 is in the spring set position, passage 88 is closed by the land 74, the knock down passage 86 is connected to exhaust passage 92 between lands 72 and 74, and the chamber containing spring 78 is connected to the exhaust passage 90. The torque converter clutch solenoid valve 98 is in fluid communication through restrictions 100 and 102 with the passage 96 and a spring chamber 104 of the main regulator valve 30. Thus, the output of the torque converter clutch solenoid valve is directed to land 68 of the torque converter clutch relay valve 56 and to the spring chamber 104 of the main regulator valve 30.

The torque converter clutch solenoid valve is a conventional pulse width modulated solenoid valve which receives a controlled pressure from the control 28. The fluid pressure supplied to the torque converter clutch solenoid valve 98 is generally reduced from main line pressure and is also filtered more carefully than the normal fluid within the transmission to ensure that the solenoid valve will not receive minor bits of debris which might occur within the transmission fluid.

Figure 4:
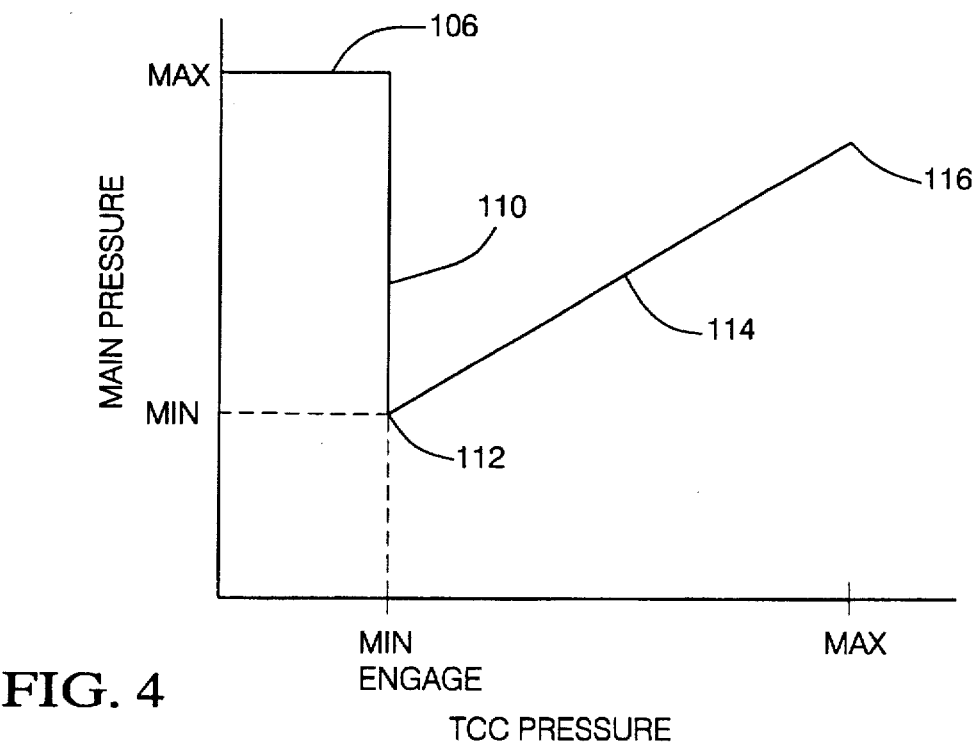
FIG. 4 is a graphical representation of the relationship between transmission main line pressure and torque converter clutch pressure.

The torque converter clutch solenoid valve 98 is energized whenever the transmission control determines it is desirable to energize or engage the torque converter clutch. As is well known, the torque converter clutch is disposed within the torque converter toms between the turbine and the input shell to cause a 1:1 drive between the input and the turbine thereby discontinuing operation of the torque converter. During torque converter operation, input torque can be multiplied in the range of 2½ to 3 times the torque supplied by the engine. Thus, the input torque to the transmission is elevated relative to the engine such that control pressures within the transmission which are utilized to engage the various clutches and brakes is maintained at a very high pressure. This is seen in FIG. 4, where during torque converter operation, the main line pressure is maintained at a very high level indicated by line 106.

When it is desirable to engage the torque converter clutch, the torque converter solenoid valve 98 is energized by the control 28 to direct fluid pressure to the end of valve land 68 and to the spring chamber 104. At a predetermined pressure level on the valve land 68, the valve spool 66 of the valve 56 will be moved downward against the force in spring 78 thereby permitting fluid pressure from the solenoid valve 98 to enter the torque converter 80 in a direction opposite from the normal torque converter. This is a standard method of engaging the torque converter clutch. When the clutch is engaged, an orifice or restriction 108 is formed in the torque converter outlet due to the actuation of the clutch. The orifice may be deliberately built into the clutch pressure plate or it may be provided by a controlled leak passage at the interface surface between the clutch plate and the torque converter input shell.

The torque converter flow during torque converter clutch operation is from the solenoid valve 98 through the torque converter 80 and the restriction 108 to the exhaust passage 92 from between the lands 70 and 72. The restriction 108 in cooperation with the restriction 100 prevents the flow of large amounts of oil through the torque converter during torque converter clutch operation. During such operation, large amounts of fluid flow are not required since very little heat is generated during this mode of operation.

The overflow or excess fluid in passage 64 from the regulator valve 30 is directed between lands 68 and 70 to the cooler 84. Also, during the pressure set position or condition of the valve 56, the main line pressure in passage 88 is directed between lands 72 and 74 to the knock down passage 86 which is in fluid communication with the differential area formed by valve lands 48 and 50.

As will be evident from the drawings, the combination of valve land 44 and the differential area between lands 48 and 50 is equal to the total area of valve land 50. The total area of valve land 50 is open to the spring chamber 104 and therefore subjected to the torque converter solenoid outlet pressure. Thus, a pressure bias on the differential area of valve lands 48 and 50 urges the regulator valve downward to reduce main line pressure while the bias pressure from the torque converter clutch solenoid valve 98 assists the spring 52 and urges the valve spool upward to increase the main line pressure.

During initial actuation of the torque converter solenoid clutch valve 98, the main pressure follows or drops decreases along line 110. This occurs because at the actuation of the torque converter clutch by the torque converter solenoid valve 98, the bias to reduce main line pressure is greater than the bias to increase main line pressure.

As an example, the main line pressure level at 106 might be as high as 250 psi while the pressure at point 112, which is the low point of the line 110, the main line pressure might be approximately 85 psi when the torque converter clutch pressure is at 30 psi which is the minimum pressure, for example, to energize the torque converter clutch. However, as the engine torque increases due to increased output speed or the vehicle encountering a grade, the pressure required to maintain the torque converter clutch, as well as other friction devices in the transmission engaged, will need to increase. To increase the pressure of the torque converter clutch, the output pressure of the torque converter solenoid 98 is increased. This will result in the pressure relationship line 114 of main line pressure versus torque converter clutch pressure.

As the torque converter clutch pressure increases from the original engagement value of 30 psi to the maximum value at point 116 of 150 psi, the main line pressure will increase from 85 psi to 205 psi. It is seen that the torque converter pressure increases by 120 psi through this range and the main line pressure increases by 120 psi through this range. Thus, it will be obvious to those skilled in the art that the main line pressure increases directly proportional to torque converter clutch pressure in the particular example given. This relationship can, of course, be varied by skillful manipulation of the various land sizes within the regulator valve 30. Those skilled in the art will recognize the various combinations that can be incorporated to provide the desired relationship between torque converter clutch pressure and main line pressure.

What is important, and what should be acknowledged, is that a single solenoid valve, that is the torque converter clutch solenoid valve 98, is provided to supply three functions (1) to control the positioning of the torque converter relay clutch valve 56, (2) to feed fluid pressure to the torque converter clutch to maintain engagement thereof, and (3) to provide a feedback or bias signal to the main line regulator to assist in controlling the level of the main line pressure within the transmission. Obviously, the reduction of pressure from line 106 in FIG. 4 to the point 112 represents a significant reduction in the required power to the pump 22. The pump power requirement then increases gradually as torque requirement increase within the transmission or as required by vehicle operation.

In transit buses, tests have shown a ten percent reduction in the pump horsepower requirement over the operating cycle of the vehicle when line pressure is controlled. Since transit buses require a number of starts and stops, it is expected that the efficiency gains in an inner city bus, for example, or an over the road truck will be greater. Efficiency gains in these types of vehicles have been estimated at anywhere from 15 to 18 percent reduction in pump horsepower requirements.

Obviously, many modifications and variations of the present invention are possible in light of the above teaching. It is therefore to be understood, that within the scope of the appended claims, the invention may be practiced otherwise than as specifically described.

What is claimed is:

1. A power transmission and control having a torque converter and a torque converter clutch selectively engageable to limit the operation of the torque converter, the control comprising:

a source of fluid;

a main pressure regulator for establishing the pressure output of said fluid source at a main pressure level;

a torque converter control valve having first and second positions for establishing the engagement and disengagement of the torque converter clutch, respectively;

said main regulator having first and second regulating areas which when subjected to fluid pressure will limit the pressure level of the main pressure and a third regulating area which when supplied with a control pressure will increase the limit of the main pressure level;

said torque converter clutch control valve being operable in said second position to exhaust fluid pressure at said second regulating area and being operable in said first position to direct fluid pressure to said second regulating area; and a torque converter clutch control solenoid operable to present a variable fluid pressure to said torque converter control valve to establish said torque converter control in the first position thereof to present a control pressure to said third regulating area of said main pressure regulator valve to enforce an increase in the main pressure level.

2. A power transmission and control having a torque converter and a torque converter clutch selectively engageable to limit the operation of the torque converter, the control comprising:

a source of fluid;

a main pressure regulator for establishing the pressure output of said fluid source;

a torque converter control valve having first and second positions for establishing the engagement and disengagement of the torque converter clutch, respectively;

said main regulator having a first regulating area for establishing a maximum pressure level and a second regulating area which when subjected to fluid pressure will assist the first area to limit the pressure level at a low value less than said maximum and a third regulating area which when supplied with a control pressure will increase the main pressure level to values between said low and maximum values;

said torque converter clutch control valve being operable in said second position to exhaust fluid pressure at said second regulating area and being operable in said first position to direct fluid pressure to said second regulating area; and a torque converter clutch control solenoid being operable to present a variable fluid pressure to said torque converter control valve to establish said torque converter control in the first position thereof and directing a control pressure to said third regulating area of said main pressure regulator valve to enforce an increase in the main pressure level above said low value.

3. A power transmission and control having a torque converter and a torque converter clutch selectively engageable to limit the operation of the torque converter, the control comprising:

a source of fluid;

a main pressure regulator for establishing a main pressure output of said fluid source;

a torque converter control valve having first and second positions for establishing the engagement and disengagement of the torque converter clutch, respectively;

said main regulator having first and second regulating areas which when subjected to fluid pressure will establish a pressure level limit of the main pressure and third regulating area which when supplied with a control pressure will increase the limit of the main pressure level, said first and second regulating areas each being individually less than said third regulating area and being equal in summation to the third regulating area;

said torque converter clutch control valve being operable in said second position to exhaust fluid pressure at said second regulating area and being operable in said first position to direct fluid pressure to said second regulating area; and a torque converter clutch control solenoid operable to present a variable fluid pressure to said torque converter control valve to establish said torque converter control in the first position thereof to present a control pressure to said third regulating area of said main pressure regulator valve to enforce an increase in the main pressure level.

* * * * *